United States Patent [19]

Crowe et al.

[11] Patent Number: 5,251,256
[45] Date of Patent: Oct. 5, 1993

[54] INDEPENDENT HYSTERESIS APPARATUS FOR TONE DETECTION

[75] Inventors: Andrew S. Crowe; Tain-Shiuann Lin, both of San Jose, Calif.

[73] Assignee: Rolm Company, Santa Clara, Calif.

[21] Appl. No.: 730,324

[22] Filed: Jul. 15, 1991

[51] Int. Cl.$^5$ .............................................. H04M 1/00
[52] U.S. Cl. .................................. 379/386; 379/381; 379/377; 381/46; 364/724.09
[58] Field of Search ............... 379/381, 382, 386, 372, 379/377; 381/46; 395/2; 364/724.09

[56] References Cited

U.S. PATENT DOCUMENTS

| | | | |
|---|---|---|---|
| 4,405,833 | 9/1983 | Cave et al. | 379/372 |
| 4,439,639 | 3/1984 | Munter | 379/386 |
| 4,528,664 | 7/1985 | Cheng et al. | 379/386 |
| 4,534,041 | 8/1985 | Munter | 364/724.09 |
| 4,696,031 | 9/1987 | Freudberg et al. | 379/386 |
| 4,805,212 | 2/1989 | Hase et al. | 379/359 |
| 5,007,000 | 4/1991 | Baldi | 379/386 |
| 5,063,593 | 11/1991 | Kwon | 379/386 |

Primary Examiner—James L. Dwyer
Assistant Examiner—M. Shehata

[57] ABSTRACT

To detect tones for call progress monitoring, hysteresis apparatus is provided whereby the output of a typical tone detector such as a comparator operating in conjunction with a selective filter is monitored by a counter. The counter is incremented and decremented according to whether the input is indicative of the presence or absence of a tone. If the counter reaches a predetermined count within a given period of time, then an indication is made that the tone exists. If the counter does not reach this predetermined count or threshold within the applicable time, then it is an indication that the tone does not exist. The thresholds of the counters plus the amount by which a counter may be incremented or decremented for each input signal is variable for each tone. In this manner a plurality of different tones on a common communications channel such as a telephone line can be continuously monitored even though each tone may be very close in frequency and the particular communications channel being monitored may be subjected to various types of noise.

20 Claims, 3 Drawing Sheets

INDEPENDENT HYSTERESIS APPARATUS FOR TONE DETECTION

RELATED APPLICATIONS

Reference is made to patent application entitled APPARATUS FOR MONITORING CALL PROGRESS TONES IN TELEPHONY filed on Jul. 15, 1991, Ser. No. 07/730,325 for the inventors herein and assigned to Siemens Corporation, the assignee herein.

BACKGROUND OF THE INVENTION

This invention relates to tone detection in general and, more particularly, to independent hysteresis apparatus for monitoring call progress tones utilized in telephone systems.

In certain telephone systems, there is employed a technique called Call Progress Tone Monitoring which is useful for applications such as outcalling and supervised transfers. Call Progress Tone monitoring is employed where the disposition of a call is used to determine the next course of action in the telephone system. Thus in such a system, a machine mimics the human's ability to discriminate between different call progress tones by detecting their distinctive tones and/or cadences. As one can understand, in telephone systems such tones are widely employed. Most familiar common signalling and control signals are dial tone, ring back and busy tones. These signals and their frequencies as well as the periods of on and off are well established although they can vary from system to system in regard to frequency, cadence and so on. As indicated in the above-noted copending application, to differentiate between different tones, one can provide a time representation of the call progress tone by transforming the analog signal into a frequency domain representation. Due to the nature of such tones, it becomes difficult to discriminate tones which are extremely close in frequency. As one will understand, tones employed in telephone systems all are accommodated within a bandwidth from about 0 to 4,000 Hz. It is within this bandwidth that such tones are employed and hence many tones are relatively close together in frequency. In this manner they become extremely difficult to reliably detect. Furthermore, when one desires to detect such tone signals on a telephone line or on a communication channel, there is a problem of identifying the tone or signal in the presence of noise. As indicated, the various tones which are desired for detection may be separated by as little as 30 Hz. One requires expensive and complicated filters to discriminate in regard to such close frequency differences and conventional filters can mistake one tone for the other tone during different time periods. In this manner the invention to be described herein employs a hysteresis technique to essentially enable one to accurately identify a tone by eliminating interference due to noise while also serving to discriminate between tones which are very close in frequency.

As is also well known in basic tone detection or signalling tones as employed in telephony, one may have tones which consist of two or three frequencies. For example, in certain PBX systems as well as in other telephone systems, dial tone may be represented as two frequencies, mainly 350 Hz plus 440 Hz. A signal referred to as "ring back" is a telephony signal which occurs for two seconds on and four seconds off and may be the combination of 440 Hz plus 480 Hz. As one can ascertain, such tone detection systems must discriminate between these frequencies which as above indicated may also be extremely close together. If one refers to the above-noted copending application, further examples of suitable tones are given. Thus prior art techniques which employed, for example, filters, and so on suffered in the sense that the tones could not be discriminated against accurately in the presence of noise and often a tone which was close to another tone in frequency would be confused with each other.

In this manner there is described a hysteresis apparatus which smooths out the frequency detection process to assist in the identification of a particular tone. The hysteresis apparatus as described enables one to adjust the sensitivity of the system to the noise associated with individual tones even in the same application as in monitoring the same telephone line or communications path.

SUMMARY OF THE INVENTION

Apparatus for enabling the accurate detection of a given tone of at least one specified frequency present on a noisy analog communications path, comprising tone detector means coupled to said path and operative to provide an output signal during the presence of said given tone on said path which output signal undesirably may be provided during the presence of noise, counting means having an input responsive to said output signal of said tone detector means and operative between a first and a second counting threshold to provide a first output when one of said thresholds is exceeded and a second output during said other threshold, and means responsive to said tone detector output signal and said output of said counting means for incrementing and decrementing said counting means according to said tone detector and said counting means output, whereby if a true tone is present on said path, said counting means will provide a given output for a pre-specified interval indicative of said tone.

DETAILED DESCRIPTION OF THE FIGURES

Figure 1:
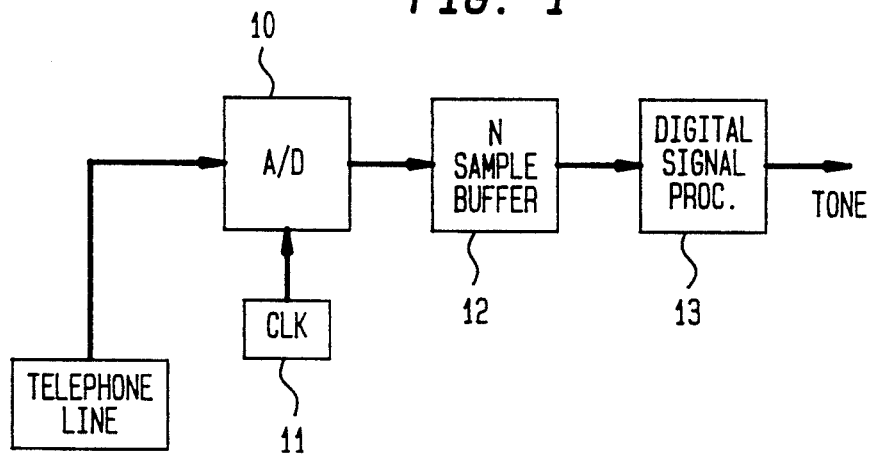
FIG. 1 is a simple block diagram depicting apparatus for monitoring call progress tones according to the present invention.

Referring to FIG. 1 there is shown a simple block diagram of one type of tone detection circuit in which the present invention can be employed. As seen in FIG. 1, a telephone line is monitored by an A/D converter 10 which is associated with a clock 11. In this example the clock 11 may provide an output sample rate of 8000 Hz. Analog-to-digital converters are well known and basically the analog-to-digital converter will operate to convert analog input signals to output digital signals. Each of the output digital signals consists of a given number of bits which essentially determines the amplitude of the signal at a particular sampling time. Thus the output of the analog-to-digital converter 10 provides digital samples. Each sample corresponds to the analog input signal. The samples are then stored consecutively in the N sample buffer 12. The N samples are processed by means of a digital signalling processor 13, which will be explained. As will be further explained, the input signal is buffered into N sample blocks which are stored in the N sample buffer 12. The output of the N sample buffer is then directed to the digital signal processor. The digital signal processor then performs an N sample Fourier transform which essentially converts the input signal into the frequency domain. Thus the digital signal processor 13 produces a spectrum of the input signal whereby the power at each frequency is then calculated by the digital signal processor.

Simply and as will be explained, the time series signal is transformed into the frequency domain. Then an algorithm extracts the salient features necessary to detect call progress tones. The algorithm compares the measured features of the input signal with entries in a tone table. Therefore each entry in the tone table has a measurement of each of the salient features for that particular call progress tone. If any of the entries in the tone table matches the current input signal, then the algorithm identifies the input as the corresponding call progress tone.

Figure 2:
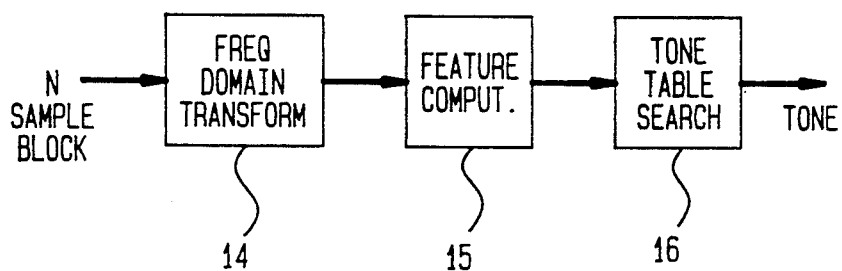
FIG. 2 is a block diagram depicting the frequency transform apparatus which can be employed in conjunction with the invention.

Referring to FIG. 2 there is shown a block diagram depicting the algorithm employed and implemented by the digital signal processor 13 of FIG. 1. The N sample block from the N sample buffer 12 is directed into a module 14 designated as the frequency domain transform. As one can ascertain, there are many ways of converting a signal into the frequency domain. One way is by the Fourier transform. Another way is to convert the signal into the frequency domain utilizing the Discrete cosine transform or the Hilbert transform. It is well known in the art to provide the operation depicted by module 14. For example, digital microprocessors or digital signal processors can approximate the Fourier transform by the sample data approximation which is well known. Thus the correct transform basically is replaced by a weighted average and errors due to sampling correspond to the repetitive nature of the weighting function. There are many references which teach one how to provide the transform as well as preprogrammed integrated circuits or digital signal processors which are available to perform the function.

Thus as indicated, the output of the frequency domain transfer module 14 provides the transformation of the digital or N sample block signal into the frequency domain. Then the power in each frequency is computed by means of module 15 designated as the feature computation which provides the frequency domain features of the signal as extracted from the power spectrum. The algorithm as will be explained, searches the power spectrum for the three highest peaks. A peak is defined as a point in the power spectrum which has greater power than its two adjacent points. Once the three highest peaks have been found, the peaks are examined and their relative power is compared. Thus the algorithm essentially classifies the input signal as a one-peak tone, a two-peak tone, or a three-peak tone depending on the peak's relative power. Other features such as signal-to-noise ratio (SNR), total signal power, and short term time domain features may also be computed. The feature computation as performed in module 15 and as indicated above is also state of the art and can be implemented by many, different and well known techniques. Once the features of the current data block of the input signal have been computed, then the algorithm sequentially compares the computed feature values with each entry in the tone table. For each feature calculated, an entry in the tone table has a range of acceptable values. If all the calculated features fit within their respective ranges in an entry in the tone table 16, then the algorithm reports the tone for that entry in the tone table. For example, the tone table has stored therein at different memory locations, both the frequency of a signal and the anticipated range in which this signal falls. The tone table basically is a memory which may be a PROM or a RAM and essentially stores a whole range of frequencies, for argument sake from DC to 4,000 Hz, and places each frequency in a particular memory location or address location. The tone table also stores at the appropriate location a valid range for each peak of a given tone. In this manner the search can determine: 1) the greatest peak in a signal; and 2) whether or not that signal is within a valid range indicative of a true tone signal. As one can ascertain, the monitored telephone line may not have a conversation occurring but yet the noise level of the line could be high. A high noise level implies frequencies throughout the entire spectrum. Thus there would be a maximum peak generated by noise. The system described completely discriminates against noise by assuming that valid signals exceed a given threshold or a given voltage and only those signals are responded to.

For an example of operation, the input signal is buffered by the N sample buffer until 256 time series data points are collected (N=256). The Fourier transform enables one to see the whole range of frequencies from 0 to 4,000 Hz in 30 Hz steps. Thus at a sampling rate of 8,000 Hz divided by 256, one approximately sees the whole range of frequencies from 0 to 4,000 Hz in 30 cycle steps (31.25 Hz). The fast Fourier transform is performed on the data. The power in each frequency is then calculated to form the power spectrum.

Figure 3:
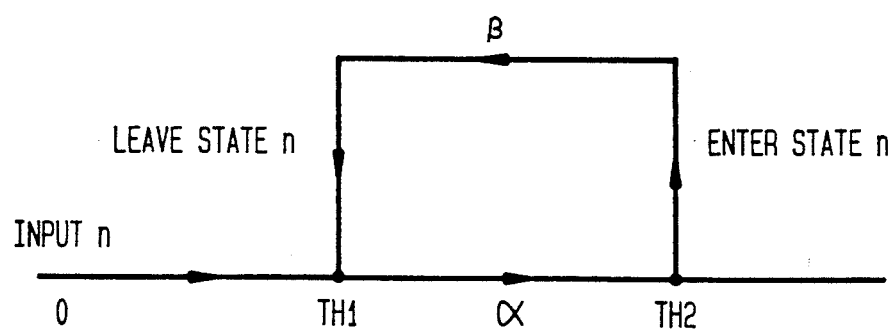
FIG. 3 is a state diagram useful in describing operation of the invention.

Thus as briefly described above, the analog signal in time is sampled by the A/D converter 10. The digital signal processor 13 receives the time domain data samples in N sample blocks where N is any convenient number. The digital signal processor 13 then performs all of the associated processing on each N sample block, one at a time. The problem exists of reliably detecting the call progress tones from their frequency content. In order to do so, one should not restrict the number of call progress tones which will be applied to the independent hysteresis nor should one restrict the sensitivity of the system. As above described and as will be explained, the input to the hysteresis apparatus to be described is obtained from the processed data samples in regard to the snapshot decisions made concerning the N samples processed as, for example, described in conjunction with FIGS. 1 and 2. Thus the input data into the hysteresis machine as described in FIG. 3 is denoted as input N. The hysteresis counter apparatus to be described operates with the above equipment but can be employed with any filter and threshold comparator apparatus as will be understood.

Referring to FIG. 3 there is shown a hysteresis counter state diagram basically to describe operation. The hysteresis counter incorporates a pair of thresholds designated as TH1 and TH2 for each type of input and a rate at which the threshold is ascended or descended. As shown in FIG. 3 there is a state designated as —leave state n— and another state designated as—enter state n—. These are associated with thresholds TH1 and TH2. When input N is received and one is not in state n, the counter is increased by the amount alpha until threshold 2 (TH2) is crossed, when it is said that we have entered state n. Any time any other input is received when we are not in state n, the state n counter is decremented by the amount alpha and one remains out of state n. When input N is received and we are in state n, the counter is incremented by beta. Any time any other input is received and you are in state n, the counter is decremented by beta and remains in state n unless the counter is less than threshold TH1. The counter is strictly bounded to values between 0 and TH2. Thus initially the state is unknown until threshold 2 (TH2) of the counter is crossed. In this case, one returns to the unknown state if there is an exit from the state when the counter crossed threshold 1 (TH1). Whenever more than one independent hysteresis operation is running, the call progress tone decision of the N sample block is the combination of all states where the respective counters exceed the threshold 2 (TH2). Before describing the operation in detail, a simple example of operation will be given. As indicated above, the digital data samples are collected until 256 consecutive runs are reached (N=256). A fast Fourier transform as, for example, denoted by module 14 is performed on the data and a snapshot decision is made regarding what type of call progress tone it might be, if any. For example, this snapshot gives an answer of Line Busy tone and thus the counter is actually in the Dial Tone state. In this manner the busy state counter is increased by alpha and busy state is entered if the new counter content crosses threshold 2 (TH2). All the other state counters are decreased by beta and hence the system leaves the dial tone state if its counter crosses threshold 1 (TH1). The system then would enter the unknown state if the dial tone state is left and no other state is entered. It is, of course, understood that the disclosed invention can be implemented in either software form through microprocessor program or hardware form through logically integrating various electronic components. While the state diagram of FIG. 3 briefly describes the invention operation, reference will be made to FIG. 4 for a clearer representation.

Figure 4:
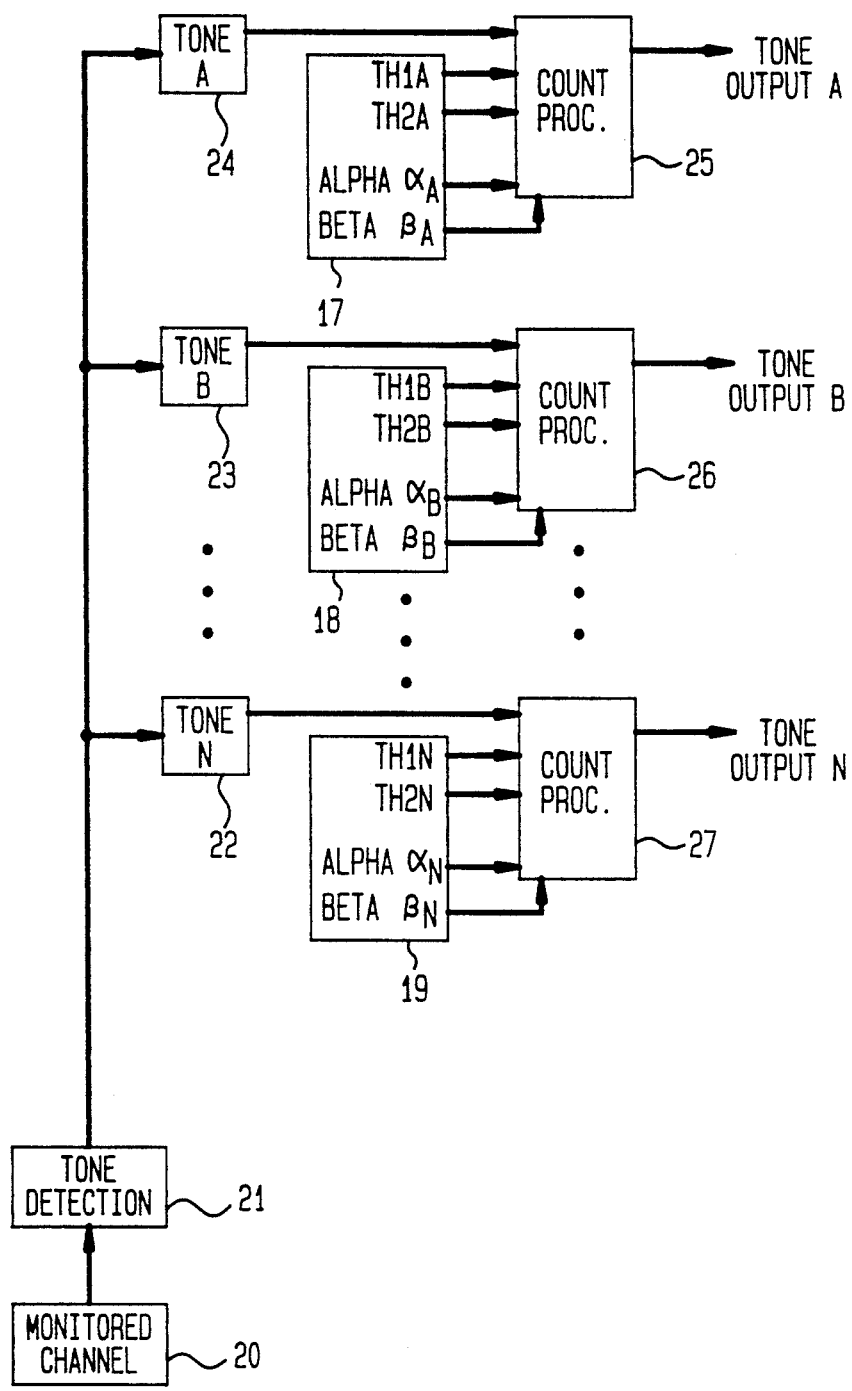
FIG. 4 is a detailed block diagram showing a hysteresis apparatus according to this invention.

Essentially as seen in FIG. 4 there is a monitored communications channel 20 which may be a telephone line or an analog path where a plurality of tones can propagate. The channel 20 typically is a noisy communication path as are telephone lines in general. While the telephone line 20 being monitored propagates various tones as signalling tones, and so on, it also contains various large noise sources. In a telephone system there are noise sources which basically contain all frequency components which are due to telephone system operation. These noises involve clicks such as hang-ups or dialing clicks or impulse noise and various other forms of noises including RF as well as resistor and white noise. Part of the objective of the hysteresis apparatus is to enable one to detect call progress tones reliably from their frequency content and in the presence of interfering noise. As indicated, the transient conditions of a telephone line 20 either during call setup or in the middle of call progress tones, can severely disturb the contents of the signal so that a call progress tone may be incorrectly detected. As will be understood the hysteresis apparatus disclosed enable these false and transient decisions to be filtered out at a sensitivity rate which is adjustable by the user. The independence of the hysteresis apparatus to be described allows each call progress tone to have a different sensitivity level so that the level can be adjusted according to the tone. This independent hysteresis allows one to accurately identify the tone. For example, at any one particular moment, more than one tone may be identified as the proper tone input, for example tone A may be confused with tone B. However, surrounding times may only identify tone A. At the output of the hysteresis only tone A will be identified and that one moment of uncertainty will be hidden from the next layer. The call progress tone detection result after processing by the hysteresis apparatus is extremely reliable and, therefore, the traditional cadence detection approach of call progress tone monitoring is not needed. The invention as will be described offers modifiability since the hysteresis is programmable, offers flexibility since the hysteresis for different call progress tones are individually controllable, offers low complexity, since the techniques adopted are easily implemented in commercial microprocessors and by simple hardware.

Again referring to FIG. 4, the monitored channel is conventionally coupled to tone detector hardware such as 21. While the tone detection techniques of the above-noted copending application are applicable here, it is also understood that the tone detector 21 may include simple digital filters or analog filters having high Q. The output from the tone detecting circuit which may be a bank or a plurality of filters is fed as inputs to the tone modules 24, 23 and 22 respectively for tone A, tone B and tone N. Each of the tones may be multiple tones as, for example, consisting of one or more tones or may be single tones. Thus the modules 22, 23 and 24 may include comparator devices as in the prior art whereby an output indicative of a tone would be emitted if the input signal exceeded a given threshold. As explained, the tones, as for example tone A and tone B, may be very close in frequency and, based on noise and other transients that appear on the line, one can be confused in regard to which tone is on the line. In this manner, as will be explained, each of the tone detectors as 22, 23 and 24 is coupled to an associated counter or count processor 25, 26 and 27. Each of the count processors is associated with four different values. One value is the threshold 1 designated as TH1 as above described. The other value is threshold 2 designated as TH2 and an alpha value and a beta value. The threshold is a state of the counter which is programmed into the counter so that the counter counts to that value in an up or down direction. The alpha is a decrement or an increment whereby the counter is decremented or incremented a given integer, for example, by a count of 1 depending on the state n the counter is in. The beta is an increment or decrement whereby the counter would be decremented or incremented by a given integer as a count of 1 also dependent upon the state n of the counter. In this manner the count processor is programmed by module 17 so that when the counter is not in state n, the counter is incremented or decremented by alpha, whereas if the counter is in state n, the counter is decremented or incremented by beta. The thresholds TH1 and TH2 are applicable for each of the different count processors and may vary. For example, the thresholds associated with tone B are different than, or the same as, the thresholds associated with tone N as well as the thresholds associated with tone A. Each of these thresholds may be the same or may be different, depending upon the selection or desires of the user. Basically the tones as from modules 24 to 22 are applied according to some given time sequence as will be explained in conjunction with the following examples.

First, the system works on a particular algorithm which essentially is implemented by the count processors 25, 26 and 27. The algorithm is applicable for each tone, as for tone A, tone B and tone N. For each input tone, the algorithm states as follows.

```
output = old state;              /* output stays same unless changed
                                    below */
if (input = FALSE) then
    if (old state = FALSE) then
        counter = counter -
alpha;
    else                         /* old state = TRUE */
        counter = counter - beta;
        if (counter <= threshold 1) then
            output = FALSE;      /* change state */
        if (counter < 0) then
            counter = 0;         /* counter must be
                                    positive */
else                             /* input = TRUE */
    if (old state = FALSE) then
        counter = counter + alpha;
        if (counter >= threshold 2) then
            output = TRUE;       /* change state */
            counter = threshold2; /* counter cannot
                                    exceed th2 */
    else                         /* old state = TRUE */
        counter = counter + beta;
        if (counter > threshold 2) then
            counter = threshold 2;
old state = output;              /* save output for next time thru loop */
loop for each tone type
    where FALSE is equal to binary 0
    where TRUE is equal to binary 1
```

TABLE I

Example 1:
Only one tone type (TONE A)
TH1 = threshold 1 = 0
TH2 = threshold 2 = 3
alpha = beta = 1

| Input | Counter | Output |
|-------|---------|--------|
| 0 | 0 | 0 |
| 1 | 1 | 0 |
| 1 | 2 | 0 |
| 1 | 3 | 1 |
| 1 | 3 | 1 |
| 1 | 3 | 1 |
| 1 | 3 | 1 |
| 0 | 2 | 1 |
| 0 | 1 | 1 |
| 1 | 2 | 1 |
| 1 | 3 | 1 |
| 1 | 3 | 1 |
| 1 | 3 | 1 |
| 0 | 2 | 1 |
| 0 | 1 | 1 |
| 0 | 0 | 0 |
| 0 | 0 | 0 |

TABLE II

Example 2:
Two types (TONE A AND TONE B)
threshold 1 = 0
threshold 2 = 3
alpha = beta = 1

| Input A,B | Counter A,B | Output A,B |
|-----------|-------------|------------|
| 0,0 | 0,0 | 0,0 |
| 1,0 | 1,0 | 0,0 |
| 1,0 | 2,0 | 0,0 |
| 1,0 | 3,0 | 1,0 |
| 1,0 | 3,0 | 1,0 |
| 1,0 | 3,0 | 1,0 |

TABLE II-continued

Example 2:
Two types (TONE A AND TONE B)
threshold 1 = 0
threshold 2 = 3
alpha = beta = 1

| Input A,B | Counter A,B | Output A,B |
|-----------|-------------|------------|
| 1,0 | 3,0 | 1,0 |
| 0,1 | 2,1 | 1,0 |
| 0,1 | 1,2 | 1,0 |
| 1,0 | 2,1 | 1,0 |
| 1,0 | 3,0 | 1,0 |
| 1,0 | 3,0 | 1,0 |
| 1,0 | 3,0 | 1,0 |
| 0,1 | 2,1 | 1,0 |
| 0,1 | 1,2 | 1,0 |
| 0,1 | 0,3 | 0,1 |
| 0,1 | 0,3 | 0,1 |
| 0,1 | 0,3 | 0,1 |

Now, referring to Table I, the Example 1 is for only one tone type where the threshold 1 is equal to 0, the threshold 2 is equal to 3. That means the counter as count processor 25, for example, for tone A counts to the count of 3 as determined by TH2. If it reaches the count of 3, then the output is changed from a 0 to a 1 as seen in regard to the table associated with Example 1. As one can understand from the table in Example 1, there is shown 12 consecutive 1's after three outputted 0's which indicates that the tone A is there. Basically, if the output stays at 1 for three consecutive and goes to 0 for three consecutive 0's, then there is an indication for the three consecutive 1's that the tone exists. If there are then three consecutive 0's this indicates that the tone is not there. Thus in regard to the example, each input signal arrives at the input to the count processor at a rate of 32 milliseconds. Three input signals will arrive at the input to the count processor in approximately 1/10 of a second or 96 milliseconds. In this particular system if the tone is present for 96 milliseconds, then the system states that the tone is there and as shown in Example 1 for one single tone type, as for example tone A, upon this condition the system will detect an output.

Referring to the table shown in Example 2, there again is shown the outputs required for two tones as input A and B for tone A and tone B. Again, threshold 1 is equal to 0, threshold 2 is equal to 3 and alpha=-beta=1. Thus as one can see from the above, the algorithm operates basically to change the output when the system detects three consecutive 1's or when the counter goes to the threshold count of 3. This is shown for the input tables designated both in Example 1 and Example 2.

Figure 5:
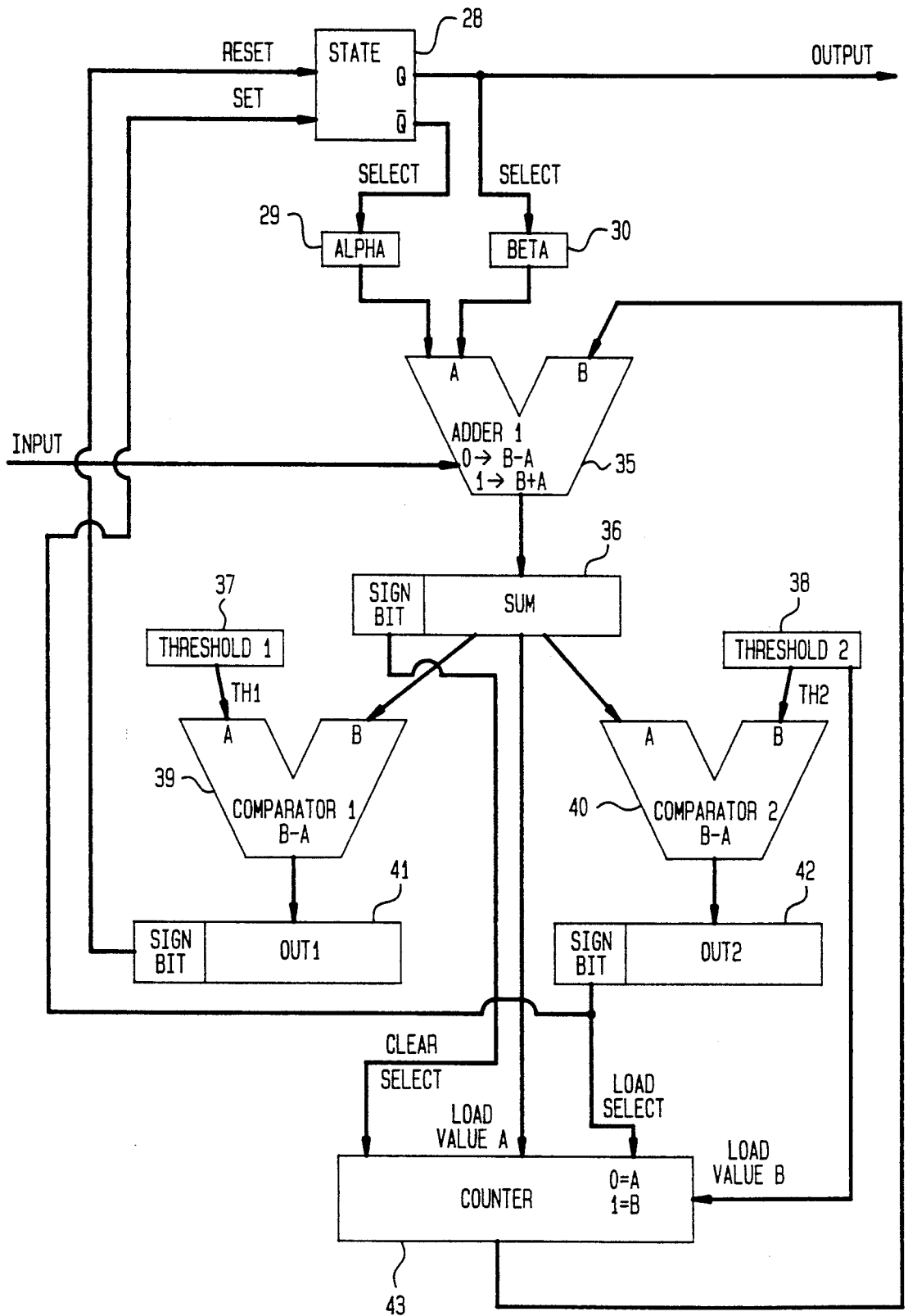
FIG. 5 is a detailed block diagram depicting a count processing module according to this invention.

Referring to FIG. 5 there is shown a typical example of a count processor as 25, 26 and 27 of FIG. 4 whose incrementing and decrementing is programmed by a module such as 17, 18 and 19 also of FIG. 4. As one can see, the input is applied to an adder module 35. The input is, for example, the output from one of the tone modules 24, 23 and 22 of FIG. 4. Each tone module as shown in FIG. 4 is associated with a count processor as shown in FIG. 5. Thus the input is applied to one input of adder 35. The output is obtained from a state flip-flop 28 from the Q output. The logic configuration shown in FIG. 5 operates as follows and according to the above-described algorithm. It is, of course, understood that while FIG. 5 shows the count processor implemented in hardware form, it is apparent that the same can be totally implemented in regard to software. Thus one can program a microprocessor or microcomputer according to the above-described algorithms to implement the count processor.

Thus as shown in FIG. 5, there is the state flip-flop 28, the output counter 43, adder 35, registers 29 and 30 which are the alpha and beta registers, threshold registers 37 and 38 in conjunction with comparators 39 and 40, as well as comparator output registers 41 and 42 and output counter 43. The system operates as follows.

Initially, the state flip-flop 28 is set to 0 as is the summer 36 and the counter 43. The suitable alpha and beta values are loaded into modules 29 and 30 at any desired value. As indicated by the examples, alpha and beta can both be 1 and that is the count processor can be incremented or decremented by 1. Any value can be applicable depending on a particular tone to be detected. Thus the values of alpha and beta, as for example, shown in Examples 1 and 2 above are loaded in registers 29 and 30. The thresholds as TH1 and TH2 are also loaded in modules 37 and 38. As indicated, threshold 1 might be equal to 0, threshold 2 may be equal to 3 or more. It is understood that the threshold values may vary and be other integers. Thus all the applicable values for that particular tone are loaded at the initial state. As indicated by the above-noted algorithm, the state of flip-flop 28 is monitored. The Q output of flip-flop 28 is the count output. If the output is true or equal to 1, the value of beta which is stored in module 30 is selected in adder 35. Thus the input A from adder 35 is selected to be 1 if the output were 1. If the output were false, then the alpha value as stored in module 29 is selected for adder 35 and this is applied to input A. The next step is that if the input which is applied to adder 35 is true, then adder 35 selects the sum of the input at input B plus input A. If the input is equal to a 0, then adder 35 subtracts the value at input port B from the value at A and produces an output. Thus when the sum in adder 35 is computed, it is latched into both the sum and counter registers 36 and 43. That is, the output from the adder 35 is latched in the sum register 36 and loaded into the counter 43. Comparator 39 performs the sum minus the threshold 1 value. Thus comparator 39 produces at the output the sum from the adder 36 minus the TH1 value from module 37. If the sum is less than TH1, then the out register 41 will be negative and the out registers sign bit will be at logic 1 or true, which will cause the state flip-flop 28 to reset to false, thus making the Q output go to 0. In a similar manner, comparator 40 performs the output TH2 minus the sum 36. The comparator has one input, namely the B input, from the threshold module 38 and the other input from the summer 36. If the sum to comparator 40 is greater than TH2, then the output to register 42 will be negative and its sign bit will be true or at logic 1 which will cause the state flip-flop 28 to be set to true or logic 1 and counter 43 will be loaded with threshold 2 or TH2. If the sum is negative, the counter will be cleared. If neither the set nor reset for the state flip-flop 28 is true, then the state flip-flop 28 holds its previous output. Thus the circuitry shown in FIG. 5 basically implements the above-described algorithm operates according to the above-noted examples.

The output of each of the tone modules shown in FIG. 4 as 22, 23 and 24 is monitored during a given time period. If the output is true, then the count processors as shown in FIG. 4 will reach the threshold 2 count and remain there as long as the input is at logic 1, indicating that a tone is there. If the output of the tone detectors are influenced by noise, then the output will be completely random and the output of the count processors will indicate that the tone is not present as the input as shown in the above-noted tables will change from 1 to 0, and so on, therefore not enabling the output to produce consecutive 1's. It is, of course, understood that the above examples indicated that TH2 is at a value of 3. While this is a convenient value for telephony systems, it is of course understood that both threshold values can be any other number. The larger, for example, the threshold value 2 is made the greater the discrimination offered by the system. It is also understood that the entire concept relies on a certain time interval being implemented for tone detection. Thus in the above-noted examples there is shown one particular frame whereby the output of the tone detectors are monitored and at the end of the frame interval which, for example, in a typical system may be between 0.5 to 1 second for the presence of so many 1's, the tone is indicated to be a true tone. This is basically how the system operates.

The invention as described can be implemented in either software form through microprocessor programming or hardware form. The programmability of the thresholds as TH1 and TH2, for each hysteresis counter allows each counter to be varied as required. The independability of hysteresis counters enables all counters to operate at the same time as, for example, shown in FIG. 4 where the main tone detection operation shown in 21 may include a bandpass filter allowing all frequencies on the monitored channel 20 to be directed to the tone modules 22, 23 and 24. Each of the modules may be providing outputs simultaneously and therefore each of the count processors operate at the same time to detect tones. One can get a clearer understanding of call progress monitoring from a review of the above-noted copending patent application or by reference to many prior art examples of call progress monitoring. It is understood that different embodiments can be implemented using the techniques described herein. It is also understood that the hysteresis apparatus has applicability to tone detection generally.

We claim:

1. Apparatus for enabling the accurate detection of a given tone of at least one specified frequency present on a noisy analog communications path, comprising:

tone detector means coupled to said path and operative to provide an output signal during the presence of said given tone on said path wherein during the presence of noise said output signal is provided undesirably;

counting means having an input responsive to said output signal of said tone detector means and operative between a first and a second counting threshold to provide a first output when one of said thresholds is exceeded and a second output when said other threshold is reached; and means responsive to said tone detector output signal and said first and second output of said counting means for incrementing and decrementing said counting means, whereby if a true tone is present on said path, said counting means will provide a given output.

2. The apparatus according to claim 1, wherein said means for decrementing and incrementing said counter includes means for selecting the values by which said counter means is incremented and decremented.

3. The apparatus according to claim 1, wherein said communications path is a telephone line.

4. The apparatus according to claim 1, wherein said tone detector means includes an analog to digital converter having an input coupled to said path for providing at an output a digital signal indicative of said given tone; and
   digital signal processing means responsive to said digital signal for providing at an output said output signal.

5. The apparatus according to claim 4, wherein said digital signal processing means includes frequency domain transform means responsive to said digital signal for transforming said digital signal to the frequency domain.

6. The apparatus according to claim 5, further including a tone table having stored therein frequency tones which appear on said path and means responsive to said frequency domain signal for comparing said frequency domain signal with said stored signals to provide at an output said given tone signal when present on said path.

7. The apparatus according to claim 1, wherein said tone detector means is a type of tone detector included in call progress monitoring means for telephony systems.

8. Apparatus for enabling the accurate detection of any one of a plurality of tones each one of a different frequency and which can be present on a noisy analog communication path, comprising:
   a plurality of separate tone detectors coupled to said path and each operative to provide an output during the presence of an associated one of said different tones;
   a plurality of separate counting means each associated with a separate one of said tone detectors, each counting means capable of operating at a different counting threshold level; and
   a plurality of incrementing and decrementing means each associated with one of said counting means and operative to decrement and increment said associated counting means according to said output of said associated tone detector means and a first and second output of said counting means, to cause said associated counting means to provide an output indicative of the presence of said tone on said path when said associated counting means is at said counting threshold level for a predetermined period.

9. The apparatus according to claim 8, wherein each of said associated counting means has a different counting threshold level.

10. The apparatus according to claim 8, further including means for selectively storing the value by which each of said associated counting means is incremented.

11. The apparatus according to claim 8, further including means for selectively storing the value by which each of said associated counting means is decremented.

12. The apparatus according to claim 8, wherein said communications path is a telephone line.

13. The apparatus according to claim 12, wherein said plurality of tones are telephone signalling tones employed for call progress monitoring.

14. A method of enabling reliable detection of a frequency signal or tone present on a noisy communication path, wherein noise can provide an undesirable output from a tone detector coupled to said path for monitoring said tone, comprising the steps of:
   applying the output of said tone detector to the input of a counter;
   loading the counter with a first threshold (TH1) and a second threshold (TH2) each indicative of a count to be responded to;
   incrementing the counter by a given amount for each output of said tone detector until said second threshold is reached;
   causing the output of said counter to indicate the presence of a tone after said second threshold is reached and for as long as said first threshold is not reached;
   decrementing the counter by a given amount each time the output of said tone detector is not present until the first threshold is reached; and
   causing the output of said counter to indicate the absence of a tone after said first threshold is reached and before said second threshold is reached.

15. The method according to claim 14, wherein the output of said tone detector is periodic, further including the step of:
   sampling the output of said tone detector over a given period at predetermined intervals in said period.

16. The method according to claim 14, wherein said first threshold (TH1) is always less than said second threshold (TH2).

17. The method according to claim 14, wherein the amount said counter is incremented and decremented is equal.

18. The method according to claim 14, wherein said communication path is a telephone line.

19. The method according to claim 18, wherein said tones are telephony tones employed in a call progress monitoring telephony system.

20. The method according to claim 14, further including the step of:
   converting said frequency signal to a digital signal prior to the step of applying.

* * * * *